United States Patent
Gillett et al.

[11] Patent Number: 5,412,700
[45] Date of Patent: May 2, 1995

[54] REACTOR REFUELING CONTAINMENT SYSTEM

[75] Inventors: James E. Gillett, Greensburg; Robert E. Meuschke, Pittsburgh, both of Pa.

[73] Assignee: The United States of America as represented by the United States Department of Energy, Washington, D.C.

[21] Appl. No.: 840,232

[22] Filed: Feb. 24, 1992

[51] Int. Cl.⁶ ............................................. G21C 19/00
[52] U.S. Cl. ..................................... 376/263; 376/205
[58] Field of Search ................. 376/203, 205, 263, 287

[56] References Cited

U.S. PATENT DOCUMENTS 3,462,345  8/1969  Jabsen ................................. 376/203
4,195,457  4/1980  Kissling et al. ..................... 376/205

*Primary Examiner*—Daniel D. Wasil
*Attorney, Agent, or Firm*—Thomas G. Anderson; Hugh Glenn; William R. Moser

[57] ABSTRACT

A method of refueling a nuclear reactor whereby the drive mechanism is disengaged and removed by activating a jacking mechanism that raises the closure head. The area between the barrier plate and closure head is exhausted through the closure head penetrations. The closure head, upper drive mechanism, and bellows seal are lifted away and transported to a safe area. The barrier plate acts as the primary boundary and each drive and control rod penetration has an elastomer seal preventing excessive tritium gases from escaping. The individual instrumentation plugs are disengaged allowing the corresponding fuel assembly to be sealed and replaced.

13 Claims, 2 Drawing Sheets

5,412,700

REACTOR REFUELING CONTAINMENT SYSTEM

CONTRACTUAL ORIGIN OF THE INVENTION

The United States Government has rights in this invention pursuant to Contract No. DE-AC02-90CH10440 between the United States Department of Energy and Westinghouse Electric Corporation.

BACKGROUND OF THE INVENTION

The invention relates to a reactor refueling containment system, where refueling is accomplished without removing the reactor vessel primary pressure boundary. More specifically, a barrier plate is used to form a primary coolant boundary and a closure head carries the applied pressure load. The barrier plate has all required penetrations for fuel replacement, instrumentation, and poision injection systems with an elastomer seal for each penetration. These penetrations are for inserting and removing fuel rods, assemblies, control rods, etc. Because of the large number of penetrations required, it was thought that the most efficient closure head would be one that is removed for refueling (Heads-off refueling) as in current light water reactors. Such a closure head would require penetrations only for control rods and instrumentation.

The design of heavy water reactors have special requirements that make refueling as currently done in light water reactors inappropriate. Both Heavy and light water reactors require ready access to the reactor cores for fuel installation and refueling. In commercial light water reactors this is accomplished by depressurizing the system and removing the reactor vessel head to a storage area. During refueling, the area located above the reactor is flooded with additional light water to provide added nuclear shielding. This method is more commonly called "Heads-off" method of refueling. This allows the light water surface to be in direct contact with the air in the containment area.

While appropriate in light water applications this method is inadequate for refueling heavy water reactors. The tritium ladden heavy water causes two problems with the Heads-off method. First, the tritiated heavy water evaporates very quickly and contaiminates the containment area which is undesirable and hazardous. Secondly, there is a contamination of the heavy water reactor coolant from light water vapor and humidity in the containment environment. This contamination by the light water is an impairment to subsequent operation of the heavy water reactor and should be avoided. Thereby requiring that a barrier be provided between the heavy water coolant and containment environment.

The reactor refueling system of the instant invention eliminates the need for a seal plate mechanism and potential long term exposure of the heavy water to the atmosphere. Thereby, eliminating the need for massive environmental cleanups and their associated costs now required with the present Heads-off method.

SUMMARY OF THE INVENTION

The present invention relates to a reactor head refueling system which allows refueling while limiting the amount of exposure and contamination to a minimum. The only penetrations in the closure head structure are those for the control and shutdown drives. The drive mechanisms are mounted on top of the closure head. The invention uses a barrier plate coupled to the reactor vessel creating a primary coolant boundary. The barrier plate has all the required penetrations, and elastomer seals, seal each penetration opening encasing each fuel cell as it extends beyond the barrier plate. Compression posts located between the barrier plate and the closure head allows for an even transfer of the applied pressure load from the closure head to the barrier plate.

In refueling the reactor after depressurization, the control rod drivelines are disengaged and removed by activating a jacking mechanism that raises the closure head. The area between the barrier plate and closure head is exhausted through the closure head penetrations. The closure head, upper control rod, and bellows seal are lifted away and transported to a safe area. The barrier plate acts as the primary boundary and penetrations for the control rod drivelines have covers preventing excessive tritium gases from escaping. The individual instrumentation plugs are disengaged allowing the corresponding fuel to be replaced. However, at any one time, only one plug is removed from the barrier plate allowing that penetration to be temporarily sealed during refueling, maintaining separation between the air environment and heavy water coolant.

It is an object of the invention to provide an efficient method to refuel nuclear reactors while minimizing the release of contaminates to the atmosphere.

Another object of the invention is to provide a closure structure which allows refueling of a nuclear reactor without complete exposure of the heavy water to the containment environment.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the invention may comprise a system for contaminate recovery for a nuclear reactor during reactor fuel cell refueling comprising: a closure head connected to said nuclear reactor, said closure head having a predetermined limited number of penetrations; a barrier plate sandwiched between said nuclear reactor and said closure head forming a primary containment boundary; and a means for sealing connected to said closure head and said barrier plate creating a secondary containment boundary.

BRIEF DESCRIPTION OF THE DRAWINGS

The accompanying drawings, which are incorporated in and form part of the specification, illustrate an embodiment of the of the present invention and together with the description, serve to explain the principles of the invention. In the drawings.

DETAILED DESCRIPTION OF THE INVENTION

Figure 1:
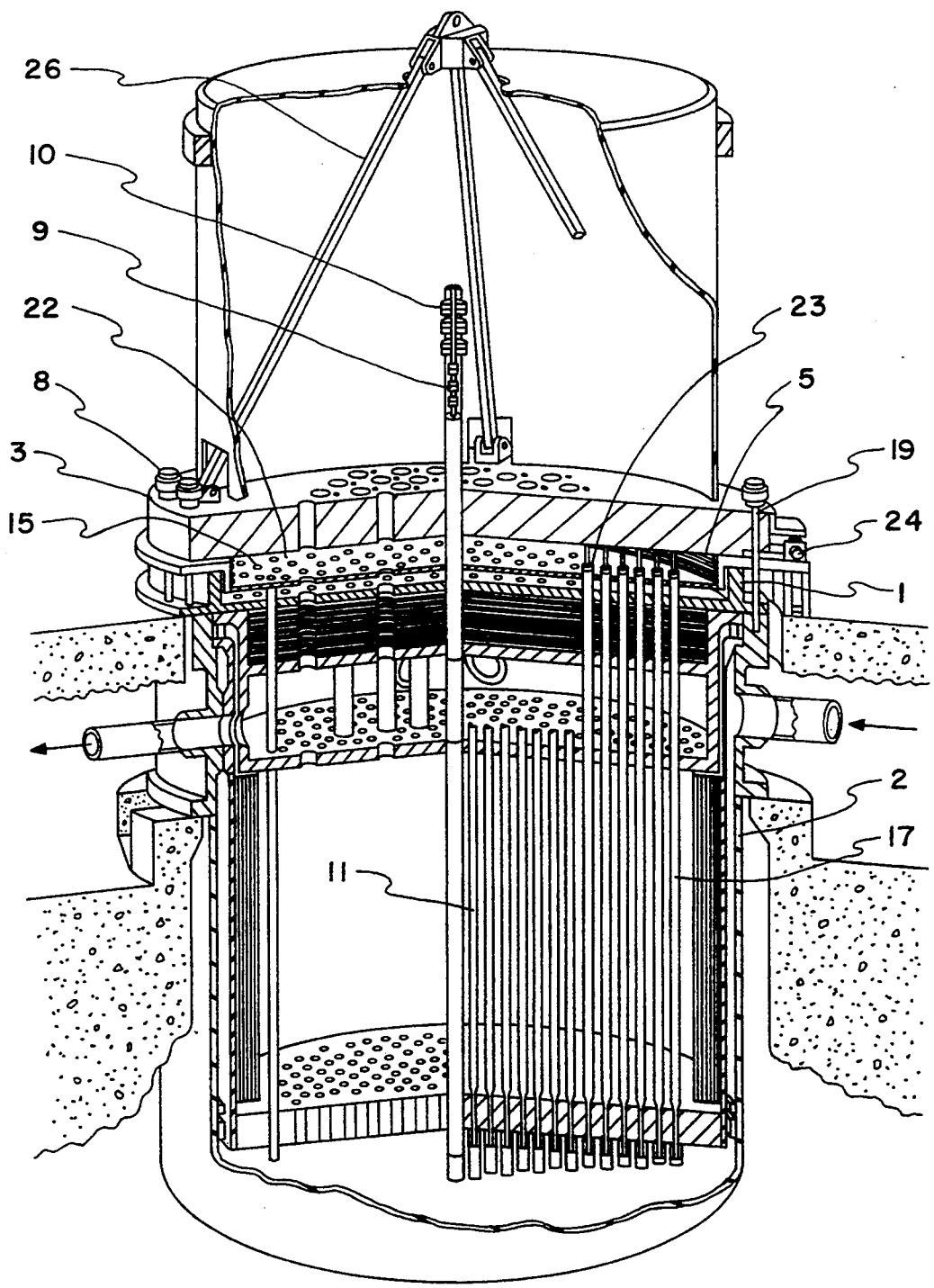
FIG. 1 shows an embodiment of the invention.
Figure 2:
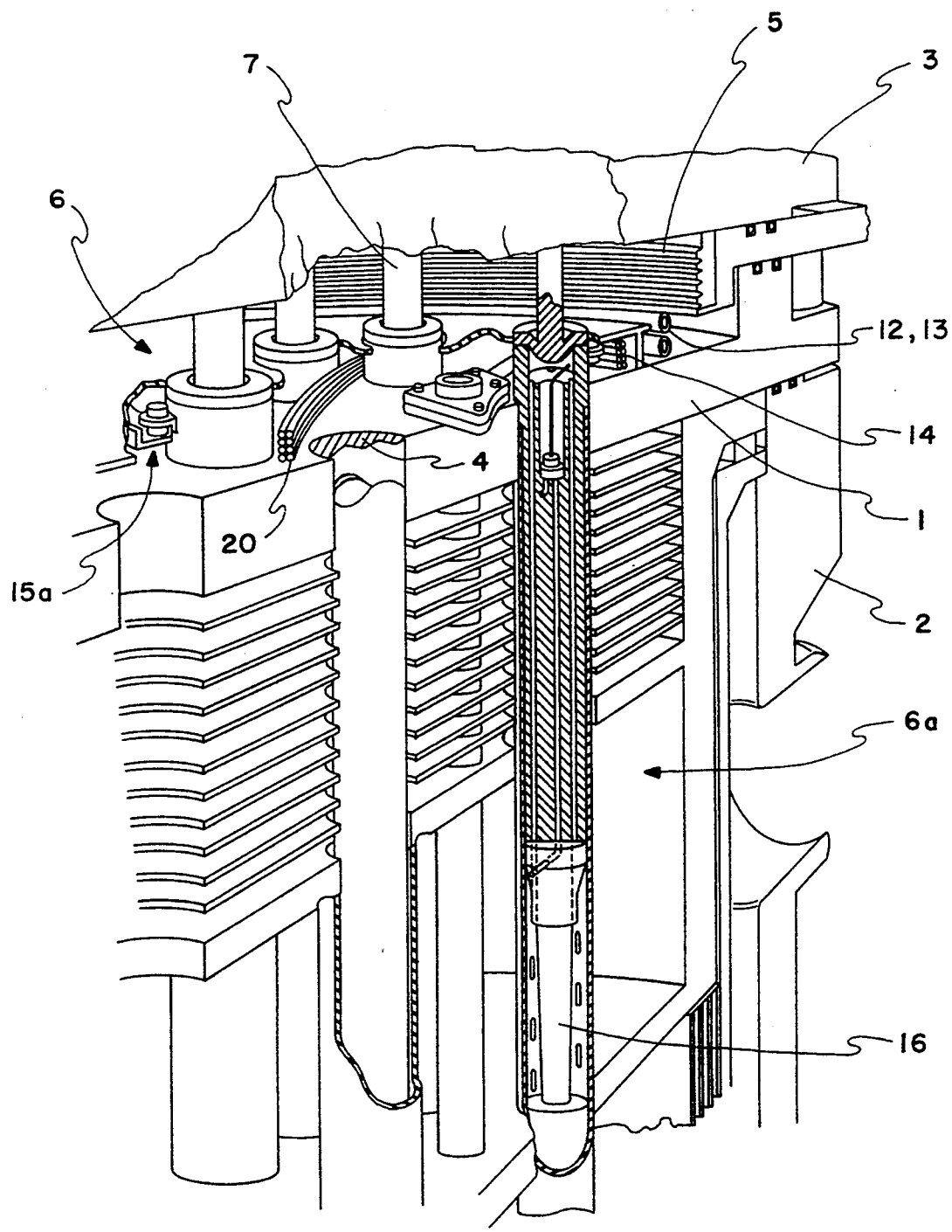
FIG. 2 shows a cut-away section of the invention as shown in FIG. 1.

Referring to FIGS. 1 and 2, the barrier plate 1 has a plurality of penetrations 15, and each driveline penetration is sealed with an elastomer flapper seal 4. The closure head 3 is a 28 inch thick solid plate or fabricated weldment of sufficient characteristics having penetrations for the control rod 9 and shutdown drive mechanisms 10. The closure head 3 and barrier plate 1 combined to form a secondary seal boundary 6. A primary boundary 6a is formed by the barrier plate 1 and the reactor vessel 2. All of the pressure load which is applied to the barrier plate 1 from the closure head 3 is transferred through compression posts 7 at every fuel tube 11 located at the bottom of the closure head 3. The load is then carried back to the reactor vessel 2 through the closure studs 8. All of the in-core reactor instrumentation 12 and gadolinium injection piping 13 are permanently affixed to the barrier plate 1. The instrumentation cables 20 are attached to a cable rack 14 suspended from a refueling guard plate 15a that is attached to the top of the barrier plate 1.

To refuel the reactor, the external structure 26 is raised by a series of screw jacks 24. The control position extension tubes are disengaged from the barrier plate 1. An elastomer bellows seal 5 exists to insure a closed envelope between the closure head 3 and the barrier plate 1. This permits containment of heavy water evaporation which feeds directly into the cleanup system without contamination of the fuel cell. The area between the barrier plate 1 and the closure head 3 is exhausted removing all contaminated gases trapped between the primary and secondary boundaries. The external structure 26 and control mechanism 10 are then removed to allow access for refueling.

During refueling instrumentation plugs 16 are removed and the fuel assembly 17 is replaced. None of the instrumentation cable 20 is disturbed during refueling. When a instrumentation closure plug 16 is removed from the top of a flow tube 11, the instrumentation in that plug is automatically disconnected at the connector 23 mounted on the guard plate 22. As the fuel assembly 17 is removed a seal may be placed over the barrier plate penetration 15 preventing heavy water evaporation while allowing the replacement of the nuclear fuel.

The foregoing description of the preferred embodiment of the invention has been presented for purposes of illustration and description. It is not intended to be exhaustive or to limit the invention to the precise form disclosed, and obviously many modifications and variations are possible in light of the above teaching.

The embodiments of the invention in which an exclusive property or privilege is claimed are defined as follows:

1. A system for contaminate recovery for a nuclear reactor during reactor refueling comprising:
   a relatively flat closure head connected to said nuclear reactor, said closure head having a predetermined number of penetrations for fuel rods, control rods, gadolinium injection piping and instrumentation;
   a barrier plate sandwiched between said nuclear reactor and said closure head forming a primary containment boundary;
   a refueling guard plate sandwiched between said closure head and said barrier plate;
   said refueling guard plate and barrier plate defining an annular chamber containing instrumentation and gadolinium injection piping; and
   a means for sealing connected to said closure head and said barrier plate creating a secondary containment boundary.

2. A system for contaminate recovery for a nuclear reactor during reactor refueling as recited in claim 1 wherein said barrier plate comprises:
   a plurality of penetrations; and
   said penetrations having means for sealing said penetrations once said fuel rods, control rods, gadolinium injection piping and instrumentation are removed.

3. A system for contaminate recovery for a nuclear reactor during refueling comprising:
   a closure head connected to said nuclear reactor, said closure head having a predetermined limited number of penetrations;
   a barrier plate sandwiched between said nuclear reactor and said closure head forming a primary containment boundary;
   said barrier plate having a plurality of penetrations for containing a plurality of fuel assemblies disposed in and extending from said penetrations;
   said penetrations having means for sealing said penetrations once said fuel assemblies are removed thereby providing a secondary containment boundary; and
   said means for sealing being a seal having the ability to act as a flap and inhibits heavy water evaporation through said barrier plate penetration.

4. A system for contaminate recovery for a nuclear reactor during reactor refueling as recited in claim 3 wherein
   said guard plate has a plurality of penetrations and with a predetermined number of said penetrations axially aligned with said penetrations of said barrier plate.

5. A system for contaminate recovery for a nuclear reactor during reactor refueling as recited in claim 4 having at least one drive mechanism having an upper and lower portion, whereby said drive mechanism is disposed in and extends from said penetration in said closure head.

6. A system for contaminate recovery for a nuclear reactor during reactor refueling as recited in claim 5 having means for lifting and sealing said closure head.

7. A system for contaminate recovery for a nuclear reactor during reactor refueling as recited in claim 6 wherein said means for sealing said closure head comprises an elastomer bellows seal which allows said closure head to be lifted to disengage said upper portion of said drive mechanism from said lower portion, while preventing release of gases within said nuclear reactor to the atmosphere.

8. A system for contaminate recovery for a nuclear reactor during reactor refueling as recited in claim 6 wherein said means for lifting includes at least one screw jack sandwiched by said closure head and said barrier plate.

9. A system for contaminate recovery for a nuclear reactor during reactor refueling as recited in claim 6 further comprising means for exhausting said secondary boundary area whereby when said upper portion of said drive mechanism is disengaged said secondary boundary area is evacuated by said means for exhausting prior to the removal of said upper portion of said drive mechanism thereby preventing the uncontrolled release of gases to the atmosphere.

10. A method of refueling a nuclear reactor having a closure head connected to said nuclear reactor, said closure head having a predetermined limited number of penetrations, a barrier plate sandwiched between said nuclear reactor and said closure head forming a primary containment boundary, a means for sealing connected to said closure head and said barrier plate creating a secondary containment boundary comprising the steps of:

lifting said closure head to disengage a drive mechanism; evacuating said secondary boundary area;

removing said closure head to remove said upper portion of said drive mechanism from said lower portion, while preventing release of gases within said nuclear reactor to the atmosphere; and replacing a fuel assembly in said reactor.

11. A method of refueling a nuclear reactor as recited in claim 10 wherein said step of lifting said closure head to disengage said drive mechanism comprises:

at least one screw jack sandwiched by said closure head and said barrier plate, whereby said screw jack is adapted to allow for the raising and lowering of said closure head; and means for sealing said drive mechanism having the abiltiy to seal a barrier plate penetration once said drive mechanism has been removed.

12. A method of refueling a nuclear reactor as recited in claim 11 wherein said means for sealing connected to said closure head and said barrier plate comprises:

an elastomer seal connected to said closure head and said barrier plate.

13. A method of refueling a nuclear reactor as recited in claim 12 wherein said step of replacing a fuel assembly comprises:

removing an instrumentation plug from said fuel assembly;

removing said fuel assembly, whereby when said fuel assembly is removed a means for sealing is placed over said barrier plate penetration preventing heavy water evaporation through said barrier plate penetration, while allowing the replacement of said fuel assembly; and replacing said fuel assembly and said instrumentation plug.

* * * * *